United States Patent [19]

Artman

[11] Patent Number: 4,784,098
[45] Date of Patent: Nov. 15, 1988

[54] INTERNAL COMBUSTION ENGINE UTILIZING STRATIFIED CHARGE COMBUSTION PROCESS

[76] Inventor: Noel G. Artman, 15830 Nicklaus La., Sun City, Ariz. 85351

[21] Appl. No.: 75,510

[22] Filed: Jul. 20, 1987

[51] Int. Cl.$^4$ .............................................. F02B 19/08
[52] U.S. Cl. ...................................... 123/262; 123/275; 123/280; 123/430; 123/500
[58] Field of Search ............... 123/262, 263, 275, 277, 123/280, 281, 282, 286, 292, 430, 496, 500, 501

[56] References Cited

U.S. PATENT DOCUMENTS

| | | | |
|---|---|---|---|
| 1,496,278 | 6/1924 | Schneider | 123/262 |
| 1,701,537 | 6/1929 | Moore | 123/262 |
| 1,837,813 | 12/1931 | Groof | 123/496 |
| 1,874,569 | 8/1932 | Meyer | 123/262 |
| 2,012,086 | 8/1935 | Mock | 123/263 |
| 2,025,362 | 12/1935 | Starr | 123/275 X |
| 2,855,908 | 10/1958 | Pflaum | 123/262 |
| 2,972,987 | 2/1961 | Steidler | 123/275 |
| 3,913,548 | 10/1975 | Wilson | 123/496 |
| 3,990,413 | 11/1976 | Pischinger | 123/275 |
| 4,052,973 | 10/1977 | Clauser | 123/295 |
| 4,332,224 | 6/1982 | Latsch | 123/254 |
| 4,465,032 | 8/1984 | Artman | 123/263 |
| 4,467,759 | 8/1984 | Artman | 123/275 X |
| 4,478,196 | 10/1984 | Hafner | 123/504 |

FOREIGN PATENT DOCUMENTS 0448554  6/1936  United Kingdom .

Primary Examiner—Willis R. Wolfe

[57] ABSTRACT

High-compression spark-ignited stratified-charge fuel-injection reciprocating-piston engine in which the combustion chamber initial charge includes a discrete air-fuel stratum that is lean with fuel at low speed idle and progressively increased in fuel richness and volume until that stratum ultimately completely fills the chamber with a homogeneous air-fuel mixture using all of the intaken air to attain maximum power. The combustion process minimizes pollutive exhaust emissions.

20 Claims, 4 Drawing Sheets

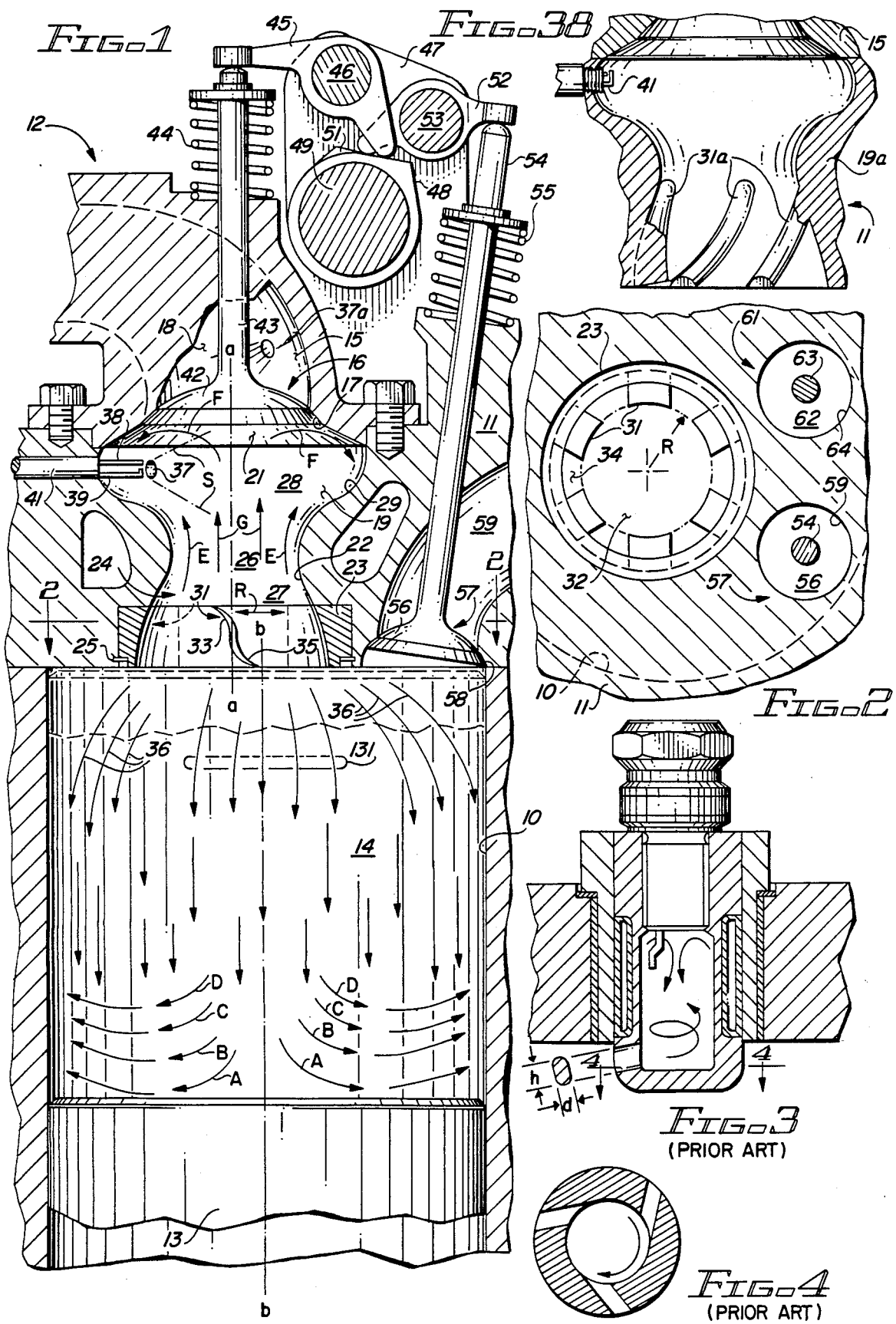

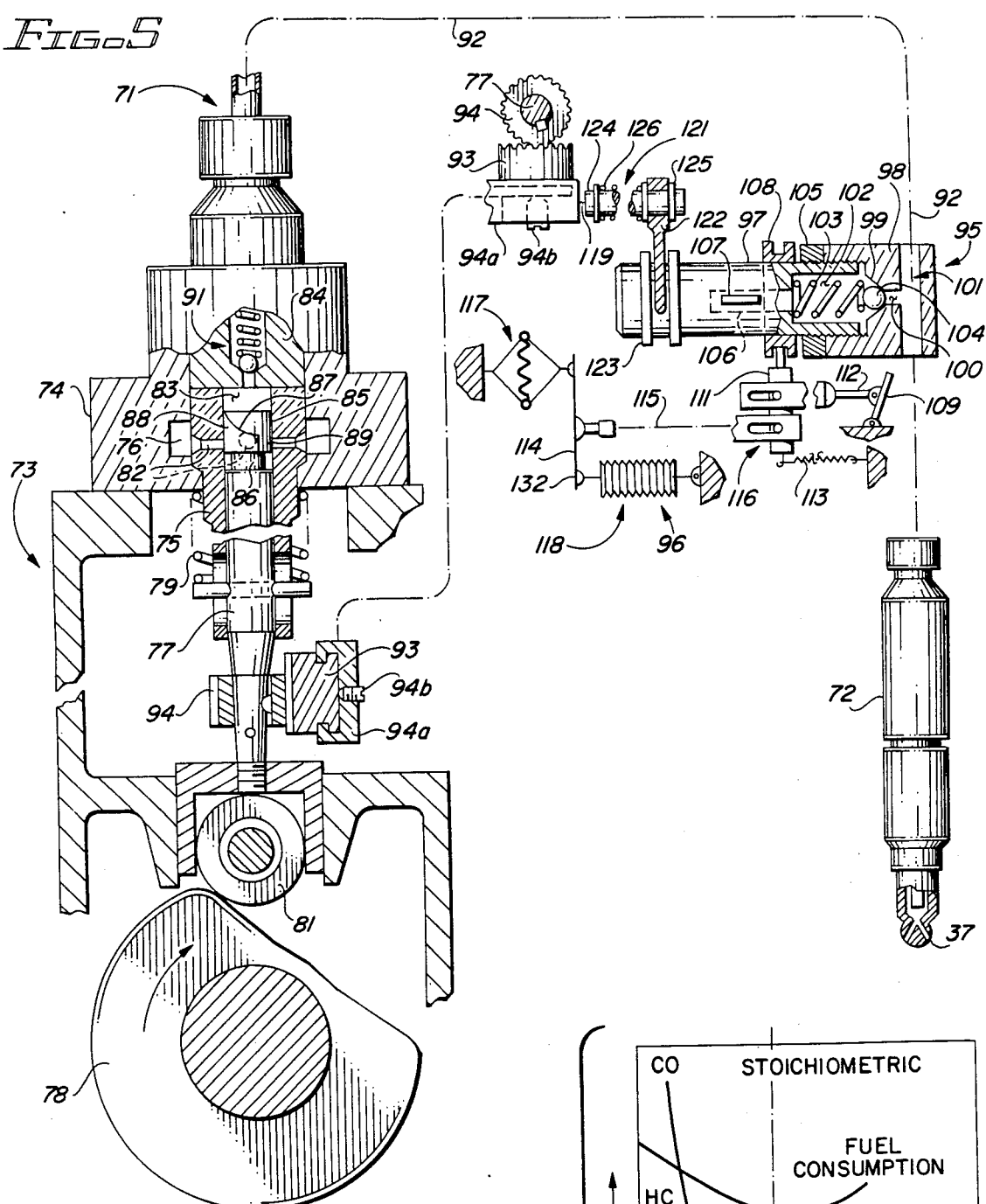
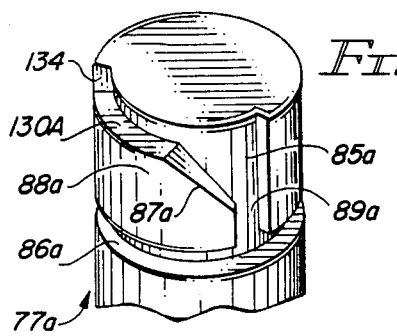
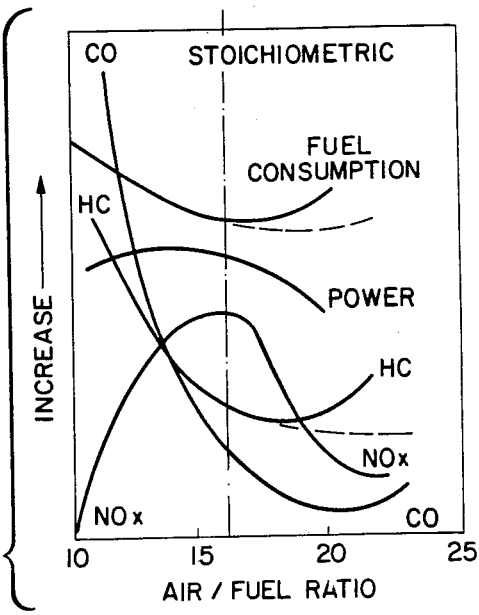

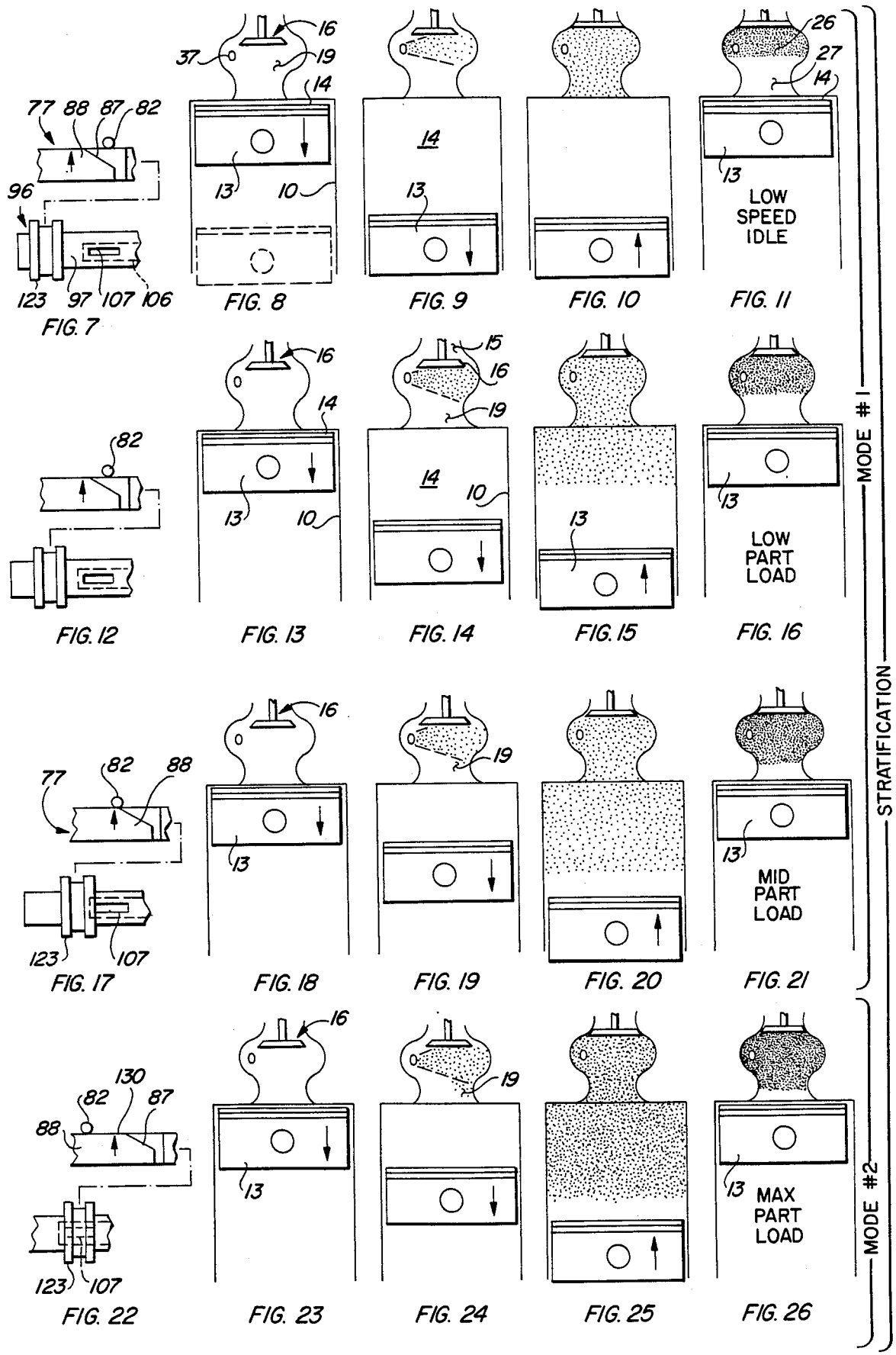

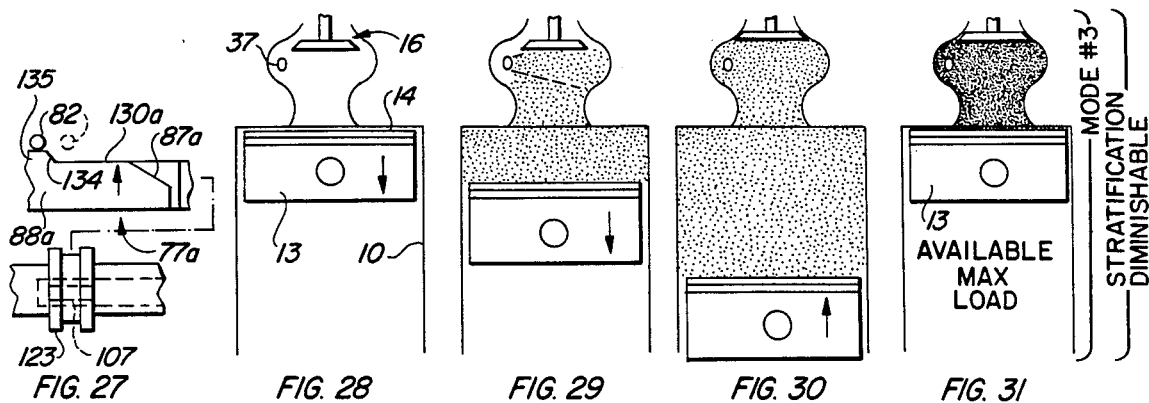
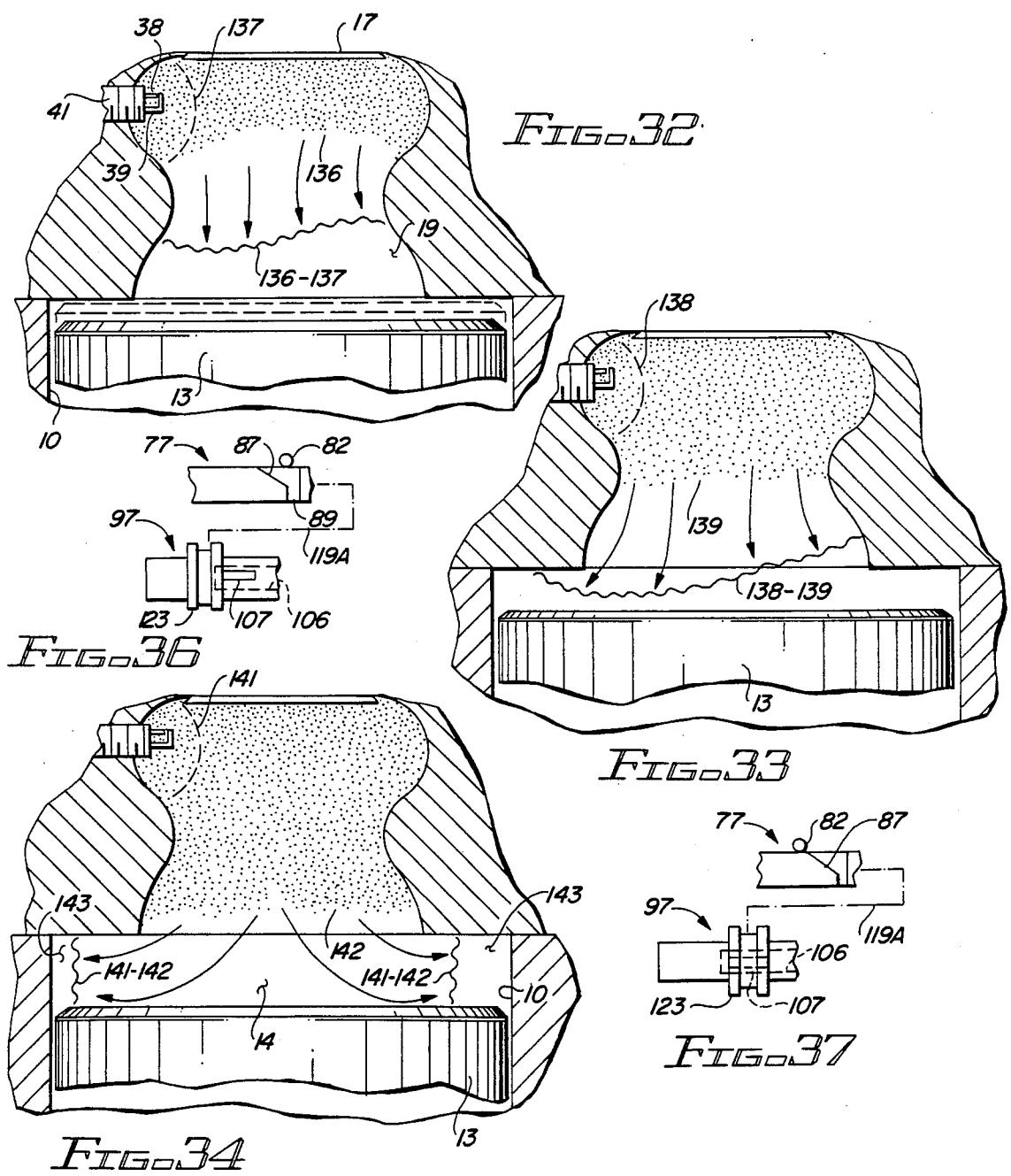

INTERNAL COMBUSTION ENGINE UTILIZING STRATIFIED CHARGE COMBUSTION PROCESS

SUMMARY OF THE INVENTION

This invention concerns stratified-charge fuel-injection spark-ignition engines and relates more particularly to such an engine wherein the combustion process involves operational modes for producing respective power ranges. The first of such modes includes a power range starting with slow speed idle to and including mid part load power, pursuant to which an air-fuel stratum relatively lean with fuel is burned adjacently to a fuel-free air stratum. During this operational mode the power output is increased by increasing the volume of the air-fuel stratum attendant to using more fuel as well as more air, which is accumulated from the fuel-free stratum, to preserve the lean fuel characteristic. A second operational mode relates to a power range extending from mid part load to and including a maximum part load power limit, and attains that load limit by increasing fuel richness of the air-fuel stratum while the volume of that stratum remains at the maximum volume reached with the first operational mode. The third operational mode covers a power range extending from said maximum part load to and through maximum available or rated power load. This is accomplished by progressively diminishing stratification by progressively increasing the percentage of intaken air mixed with fuel at an increased fuel delivery rate, thereby obtaining a more voluminous air-fuel mass of rich fuel content.

Combustion of a single spark-ignited fuel-rich homogeneous mixture within an engine combustion chamber is known to produce destructive audible engine knock generally considered to be caused by autoignition occurring ahead of the flame front in a small residual portion of the burnable mixture. This undesirable characteristic is intensified by increase in compression ratio which is desired to diminish pollutive exhaust emissions and to obtain higher thermal efficiency. The present invention provides for higher than conventional compression operation without knock by replacing the residual burnable air-fuel portion with air containing no fuel, thereby eliminating the source of detonative pressure rise resulting from autoignition.

At higher compression ratio, 12 to 1 for example, the molecules of fuel and oxygen in a lean fuel mixture have sufficiently increased population density to reliably ignite and burn rapidly for fast flame propagation which provides less time for heat loss to the chamber walls. Also, the air in this mixture, because of being in abundant supply, causes combustion to develop lower mean temperature to transfer less heat to the chamber walls.

The combustion process herein presented provides ample time during end-to-end air intake and compression phases for thorough homogeneous mixing of injected fuel in the air-fuel stratum which, with the provision of rapid swirl of this highly compressed stratum, are conducive to reliable ignition, fast burn and extension of the lean mixture misfire limit.

Advantages of excess air operation with respect to exhaust emissions are illustrated in FIG. 6 which is a copy of that appearing on page 50 of the February 1984 issue of Automotive Engineering magazine. Use of the discrete air-fuel mass stratum is further conducive to minimizing generation of nitric oxides ($NO_x$) pursuant to combustion. This is because the free oxygen molecules $O_2$ of air will react chemically with the nitrogen molecules $N_2$ to form NO only at extremely high temperature as that within the flame front end within a thin film-like space contiguously following that front. For support of this assertion reference is invited to the text titled Inorganic Chemistry by Fritz Ephraim (1943) which on page 671 states that "In order to obtain a fair yield" of 2NO from $N_2$ and $O_2$ "an exceptionally high temperature must be employed; 4200° T. corresponds approximately to that attained in the electric arc, and favourable yield can then be obtained." The average temperature of combustion products in a combustion chamber is much below 4200° T. as noted in the text authored by Patterson, D. J. and Heinein, N. A. titled Emissions from Combustion Engines and their Control, copyright 1972 by Ann Arbor Science Publishers, Inc. which on page 100 states: ". . . in the cylinder of an engine running at wide open throttle (WOT), the combustion products exist at temperatures near 4000° F." which is 2477° T. And, a text titled Internal Combustion Engines and Air Pollution (1973) authored by Edward F. Obert, professor of mechanical engineering, University of Wisconsin, at page 519 states: "It is well established that NO is formed in the hot flame of combustion, of amount dictated primarily by temperature." Considering establishment as fact that NO is formed only in close physical association with the flame front during its fuel consuming advancement in the combustion chamber and that in a stratified charge within the chamber this flame front exists only in the air fuel stratum, no $O_2$ in the fuel-free stratum will be subjected to the flame high temperature, wherefore, with the stratified combustion process there is less exposure of $O_2$ to temperature sufficiently high to react with $N_2$ of the air to form NO than in the case of a single homogeneous air-fuel mass in the conventional spark-ignited chamber in which the flame front traverses the entire chamber.

An important novelty in the presented structure is the arrangement between the prechamber and the cylinder's variable volume space of air flow control means in the form of vanes spaced peripherally about a central open end of the chamber providing two-way communication between that chamber and the space. The chamber is part of the air intake passage and during the intake stroke of the piston the vanes compose the air stream, then flowing through the chamber into the space, into a central core portion directed axially into the space and a tubular portion directed helically about the core portion to effect stratification in seriatim axially within said space of leading and trailing parts of the air thus introduced into said space. And, these vanes are also operable, during the ensuing compression stroke and reverse flow of the leading and trailing air parts in reverse order, to compose the stream thereof into respective stratum stacked in axial seriatim within the prechamber. This method of air flow control attains accurate stratification in the prechamber where the stratum most remote from the variable volume space and the chamber open end is that containing the fuel. The vane arrangement is referred to at this time to immediately dispel any apprehension that these vanes would be heated by combustion gases to become "hot spots" that would cause preignition or autoignition of the air-fuel mix. Each of these erratic malfunctions is avoided because these vanes of relatively small mass are cooled by fuel-free intake air rushing thereagainst during the initial part of the engine air intake stroke.

An advantage of the presented structure and that part of of the combustion process stratifying the air-fuel stratum in part of the prechamber is the globular shape of this stratum thereby shortening the distance of flame travel and combustion time attendant to low speed idle and part load operation. Diminishing the combustion time incurs less heat loss to the chamber walls. Also, combustion time is diminished by the fact that the air-fuel stratum is unadulterated with combustion residue because the air in the stratum is freshly drawn through the air intake passage and compressed while segregated from such residue which would have been swept from the prechamber during the initial part of the engine intake stroke.

Although combustion occurs mostly in the prechamber, thereby concentrating heat transfer to walls of limited area, it does not follow that heat transfer from these walls to intake air would, by air expansion, limit air intake in comparison to the conventional engine having no prechamber. Total combustion heat absorbed by walls of the prechamber and of the variable volume space is actually less than if all of these walls absorbed that heat at the same rate; there is merely a different wall distribution of absorbed heat. While the hotter walls of the prechamber will impart more heat to incoming air than if cooler, that air will dissipate heat and contract upon entering the variable volume space, thereby counteracting expansion in the prechamber. Since the structure is considered not to limit the amount of intaken air relatively to the conventional engine, this engine will incur no disadvantage in its ratio of engine power-to-weight because of unconventional wall heat distribution.

DESCRIPTION OF DRAWING FIGURES

FIG. 1 is a fragmentary view taken sectionally through an engine cylinder and cylinder head containing a precombustion chamber and air deflecting means arranged in accordance with this invention.

FIG. 2 is a fragmentary sectional view taken at the plane indicated by the line 2—2 in FIG. 1.

FIG. 3 is a sectional view of a combustion chamber in which the character of air flow is illustrated by arrow, the view being a copy of FIG. 1 in prior art U.S. Pat. No. 4,332,224.

FIG. 4 is a sectional view taken on the line 4—4 in FIG. 3 and is a copy of FIG. 2 in said U.S. Pat. No. 4,332,224.

FIG. 5 is a diagrammatic view with parts shown in section of fuel delivery means included in this invention.

FIG. 6 is a graph illustrating typical variance of exhaust emissions, fuel consumption and power with change in air-fuel ratio.

FIG. 7 is a fragmentary diagrammatic view of parts of the fuel delivery means showing panoramically radially inwardly the metering portion of the fuel pump in rotative position to attain low speed idle operation of the engine.

FIGS. 8 through 11 are diagrammatic views illustrating the position and volume of air-fuel mixtures correlated in timed relation with piston position and direction of movement during low speed idle operation of the engine.

FIG. 12 is a view similar to FIG. 7 but showing the positions of parts set to attain low part load operation.

FIGS. 13 through 16 are views respectively corresponding to FIGS. 8 through 11 during low part load operation attained with the FIG. 12 settings.

FIG. 17 is a view taken similarly to FIG. 12 but showing the relative positions of parts to attain a part load operation with greater power output.

FIGS. 18 through 21 are views respectively corresponding to FIGS. 13 through 16 but illustrating fuel distribution during the greater part load operation attained with the FIG. 17 setting.

FIG. 22 is a view similar to FIG. 17 but showing the relative position of parts to attain maximum part load output by changing the fuel delivery rate during the fuel delivery period of duration also attained with the FIG. 17 setting.

FIGS. 23 through 26 are views respectively corresponding to FIGS. 18 through 21 but illustrating a degree of fuel richness in the air-fuel mass attainable with the FIG. 22 setting.

FIG. 27 is similar to FIG. 22 but showing the relative positions of parts with a modified pump plunger providing for gradational increased length of the fuel injection period to attain fuel mix with substantially all of the intake air.

FIGS. 28 through 31 respectively correspond to FIGS. 23 through 26 but illustrate the greater air-fuel mass volume attainable with the FIG. 27 modified plunger.

FIG. 32 is a fragmentary diagrammatic view illustrating advance of the flame front correlated with piston descent pursuant to combustion of the low speed idle air-fuel stratum of FIG. 11.

FIG. 33 corresponds to FIG. 32 but with respect to the part load air-fuel stratum of FIG. 16.

FIG. 34 also corresponds to FIG. 32 but with respect to the greater part load air-fuel stratum of FIG. 21.

FIG. 35 is fragmentary perspective view of the upper end portion of the modified pump plunger shown diagrammatically in FIG. 27.

FIGS. 36 and 37 are diagrammatic views illustrating a modified relation between the fuel pump plunger and the fuel pressure regulator to obtain an operational mode usable of all intaken air for combustion.

FIG. 38, a sectional view through a modified combustion chamber.

DESCRIPTION AND EXPLANATION OF THE INVENTION

A cylinder 10 and cylinder head 11 of a 4-stroke cycle internal combustion engine 12 embodied in a preferred form of this invention are most completely shown in FIGS. 1 and 2. A piston 13 reciprocates conventionally in the cylinder pursuant to varying the volume of an alternately expandable and contractable variable volume space 14 in the cylinder between the piston and the cylinder head. An inlet passage 15 communicating with the variable volume space contains an air inlet valve 16 of the poppet type having an annular seat 17 disposed between an upstream portion 18 of such passage and a precombustion chamber 19 which is a section of the passage. Thus this chamber is interposed serially between the variable volume space and the upstream passage portion 18.

Chamber 19 has a principal axis a—a extending between opposite ends thereof and of which ends one, designated 21, is an air inlet end communicative with the upstream passage portion 18 through the valve seat 17 which surrounds the axis a—a. The other end of the chamber is an open end in juxtaposed two-way open communication with the variable volume space 14. The chamber has an inwardly-facing periphery 22 surrounding the axis a—a. Part of that periphery is borne by a ring 23 set firmly into the lower face of cylinder head 11. The ring, which is an element of air flow control means 24, may be retained in place by a snap ring 25. That part of the inwardly-facing periphery 22 borne in the ring and extending therefrom upwardly to a throat 26 of the hourglass-like interior of the chamber embraces a chamber vestibule 27. A main chamber portion 28 of bulbous shape disposed adjacently to the air inlet end of the chamber has a radially inwardly-facing peripheral girth about axis a—a in excess of such girth of valve seat 17 and of the girth of the radially inwardly-facing periphery of throat 26. Main chamber portion 28 terminates at its lower end with a portion 29 of its inwardly-facing periphery axially spaced from the chamber inlet end and converging away from such end toward the axis a—a, thus providing a contour imposing minimal resistance to the interflow of air or gas between the main and vestibule portions of the chamber. Similarly, a portion of the vestibule inner periphery adjacently to the throat 26 is convergent, upwardly as viewed in FIG. 1, to such throat and toward the axis a—a.

Air deflecting vanes 31, forming part of the air flow control means 24, are disposed within the vestibule 27 and are operable cooperably with the periphery 22 to cause air entering the chamber from the variable volume space 14 to flow helically upwardly about the axis a—a. These vanes which are supported by the ring 23 project in cantilever fashion into an annular space disposed between the vestibule portion of the periphery 22 and a cylindrical unobstructed central space 32 contiguously surrounding axis a—a and represented by radius lines R and a circular dot-dash line coinciding with the radially inner edges of vanes 31, FIGS. 1 and 2. This central space accommodates substantially unobstructed flow of air or gas therethrough between the variable volume space and the chamber interior. Vanes 31 which are spaced apart circumferentially about the axis a—a are disposed to slant air deflecting surfaces 33 in the same direction helically about such axis to impart helical motion about that axis to a tubular portion 34 between vanes 31, FIG. 2, of an air stream (later described) entering the chamber from the variable volume spase. Air deflecting surfaces 35 of the vanes are also slanted helically about axis a—a to similarly deflect tubular portion 34 reversely as an air stream represented by the bundle of arrows 36 entering the variable volume space from the chamber.

A diagrammatically shown fuel injection nozzel 37 is adapted to inject an evaporative fuel into the chamber 19. A typical conical spray pattern for such injected fuel is represented by the dash lines S. The fuel is mixed with air in chamber 19 to form a spark-ignitable air-fuel mixture ignited by spark occuring between electrodes 38 and 39 of spark plug 41. Alternatively a fuel injector unit 37a could be located in the air intake passage above the intake valve to inject into the chamber when the valve is open.

Poppet valve 16 has a head 42 on a stem 43 which is typically unseated from the valve seat 17 by downward thrust on the stem against the force of a spring 44. This downward thrust is provided through a rocker arm 45 pivoting on a bearing 46 supported by a bracket 47 mounted on the cylinder head. A cam 48 rotatable with an overhead cam shaft 49 pivots the rocker are to operate the valve in timed relation with the engine crankshaft, not shown. A second cam 51 on the camshaft pivots rocker arm 52 on its bearing 53 to thrust an exhaust valve stem 54 downwardly against the force of a spring 55 to unseat the head 56 of exhaust valve 57 from its seat 58 and establish communication of variable volume space 14 with an exhaust passage 59. There are two exhaust valves 57 and 61, FIG. 2, the latter being conventionally operated similarly to valve 57 and having a head 62 on stem 63 and controllng communication of the variable volume space 14 with an exhaust passage 64.

A species of fuel delivery means 71 for the engine is shown in FIG. 5 where the nozzle 37 shown in FIG. 1 is part of an injector 72. Fuel is supplied under regulated pressure to the injector from a pump 73 of which casing 74 containing a barrel 75 includes a fuel supply gallery 76 surrounding the barrel. A plunger 77 reciprocally in the barrel is operated by a cam 78 and a spring 79 which presses a tappet roller 81 of the plunger in contact with the cam profile. Near completion of the down stroke of plunger 77 fuel from gallery 76 is forced through a fill and spill port 82, then above the upper end of the plunger, into the fill space 83 between that upper end and the cap 84 of barrel 75. The plunger has in its cylindrical periphery a recess 85 communicating between fill space 83 and a groove encircling the plunger. A metering edge 87 of recess 85 extends helically on the plunger and divides that recess from a masking portion 88 of the plunger.

Pursuant to upward movement of the plunger from its lower limit, where filling of space 83 occurs while the upper end of the plunger is below the port 82, and providing the plunger is in a rotative position placing a narrow lower end 89 of recess 85 in axial registry with port 82, fuel will be forced from space 83 through recess 85, groove 86 and port 82 back into the gallery. However, when the plunger is rotatively adjusted to bring its masking portion into axial registry with port 82, communication back to the gallery is prevented so fuel will be forced upwardly through a check valve 91 into a fuel delivery line 92. The rotative position of plunger 77 is controlled by a gear-toothed rack 93 of which the teeth mesh with a gear 94 fixed to the plunger.

Rack 93 is slidably adjustable endwise on a bar 94a where a setscrew 94b retains the adjustment. Bar 94a is adapted for the mounting thereon of additional similar racks for rotative adjustment of other plungers. Separate racks, or rack sections, are used so the injection periods of plungers for a multicylinder engine can be accurately synchronized.

A section of the fuel line 92 is in the casing 95 of a pressure regulator 96. This casing comprises a cylindrical element 97 threaded at one end for assembly with an interiorly threaded cap 98 in which a lateral bore 100 leads from the line 92 through the seat 99 of a ball type check valve 101 to a spring chamber 102 in the end of element 97. A spring 103 urges the valve ball 104 onto the seat and the pressure of this spring on the ball is adjustable by rotating the element 97 and the screw threads thereon relatively to the cap 98. The adjusted position is retained by a locknut 105. A counterbore 106 of the spring chamber is provided with an elongated spill opening 107 of slit-like proportions communicating radially outwardly through the cylindrical element 97. Throttling of the spill opening 107 creates fluid back pressure supplementing the force of spring 103 in resisting displacement of valve ball 104 from seat 99 to increase pressure in line 92 and that pressure imposed on the injector 72. A masking sleeve 108 is controlled by a manually operable lever 109 to partially mask spill slot 107 during cold starting of the engine, to increase pressure in the line 92 and the fuel deliver rate by nozzle 37. The masking sleeve is connected to manual lever by a shifter fork 111 and a link 112 having a lost-motion connection with the fork. A spring 113 connected to fork 111 yieldably urges the sleeve 108 into its unmasking position shown in FIG. 5.

Other means, responsive to engine speed and intake air pressure, automatically controls the masking position of sleeve 108. This means includes a universal lever 114 operably associated with fork 111 by a link 115 having a lost-motion connection 116 with the fork. One end of lever 114 is pivotally connected with an engine speed sensor device 117 and likewise connected at its other end with an engine air intake manifold pressure sensor device 118. The functions of these two devices will be explained later. In the upper part of FIG. 5 where the pump plunger 77 is shown in transverse section, the rack-supporting bar 94a can be seen to have an operating connection 119 through a lost-motion device 121 and shifter fork 122 with a second masking sleeve 123 for the spill slot 107. The lost-motion device 121 includes a rod 124 on which the fork 122 is slidably mounted and where such fork is yieldably urged against a stop 125 by a spring 126. The operating connection 119 enables the power demand control structure, consisting of the gear supporting rack, to control the pressure regulator 96 by sliding the masking sleeve into masking relation with the slot 107 to change the pressure of fuel and increase the amount of fuel delivered from the initial time of delivery. The function of these parts also will be explained later.

ENGINE OPERATION

Operation of an engine incorporating the above-described components is as follows: Starting with the downward air-intake stroke of piston 13 of this 4-stoke cycle engine, air is drawn inwardly through the upstream protion 18 of the air-intake passage 15 past the then open intake valve 16 and through the precombustion chamber 19 into the variable volume space 14 while the exhaust valves 57 and 61 are closed. Any contaminates such as incompletely oxidized hydrocarbons retained in the chamber during the preceding exhaust stroke of the piston, are swept from the chamber with the intake air into the variable volume space.

That part of the intake air entering the variable volume space from chamber 19 does so in the form of a stream composed of a tubular protion 34, FIG. 2, sweeping in contact with the inner periphery of the vane-supporting ring 23 in the spaces between the vanes spaced circularly about the chamber axis a—a and enveloping a stream core portion 32 of cylindrical shape within the cylindrical central space of radius R illustrated in FIGS. 1 and 2. The axial center of the chamber's lower open end is disposed in close proximity with the cylinder axis b—b so that the tubular air stream portion 34 set in helical motion by the deflecting surfaces 35 of vanes 31 about axis a—a, enters the variable volume space helically about the cylinder axis b—b. Upon entering said space the tubular stream protion because of centrifugal force developed by its helical motion will expand radially to move downwardly adjacently to the cylinder wall, as illustrated by the bundles of arrows 36, while following the downwardly moving piston. Were it not for a counter effect of the concurrently downward entry of the stream core portion 32, the leading part of the helically-moving tubular portion 34 upon contact with the downwardly-moving piston crown would be deflected thereby and by the cylinder wall first radially inwardly of the variable volume space and then axially upwardly in the form of a reflux about the axial center of that space. The phenomenon of such a reflux is graghically illustrated in FIGS. 3 and 4 which are duplications of FIGS. 1 and 2 in U.S. Pat. No. 4,332,224, a citation of record in this case, assigned to Robert Bosch GmbH of Germany wherein the air arrangement is described with reference to the reflux as a "secondary swirl coaxial to the cylinder axis". However, the stream core portion 32, because of being unimpeded by the vanes 31 in its movement axially into the variable volume space where it is represented by the bundle of arrows 131, will approach the piston crown with slightly greater speed than will the helically-moving tubular portion and will be deflected by such crown first radially outwardly and then by the cylinder wall upwardly relatively to the piston and between the following downwardly-flowing part of the core portion and the cylinder wall. This "upwardly deflected" air constitutes an annular reflux which if left unopposed would flow upwardly relatively to the downwardly-moving piston. But, the first of this "upwardly deflected" air of annular reflux, formed adjacently to the piston crown while the piston is in the early part of its descent from top dead center, will be forced by the downwardly-moving helical tubular portion to follow the piston downwardly. The first of such annular reflux air is represented by the arrows A in FIG. 1. Succeeding parts of this reflux air, respectively represented by arrows B, C, and D, are also forced downwardly by the helical tubular air portion represented by arrows 36. The result of the motions of these two air stream portions is that the air entering the variable volume space laminates or stratifies with stratum disposed in seriatim axially of the cylinder.

During the ensuing compression stroke of the piston, while the intake and exhaust valves are all closed, the stratified air is forced from the contracting variable volume space past the air deflecter vanes 31 further into the prechamber and in the reverse order of which the stratum were forced in said space. A tubular part of the reentering air stream within the annular space 34, FIG. 2, and between the vanes is deflected by their deflecting surfaces 33 to spin helically about axis a—a while advancing farther upwardly into the chamber. A core part of that air stream entering the chamber through the cylindrical space 32 of radius R is peripherally engaged by the helically spinning tubular air portion which is deflected radially inwardly thereagainst by the vestibule portion of periphery 22 that converges upwardly to the throat 26. In this manner the helically spinning air imparts some spinning motion to the core portion of air entering through the central space 32. The upwardly-flowing core portion represented by arrows G and F, because of being unimpeded by the vanes 31, flows upwardly at slightly greater speed than the helically spinning tubular air portion represented by the arrows E and therefor, when blocked in its upward flow by the upper end of the chamber, flows radially outwardly and slightly downwardly as illustrated by the arrows F. However, such downward flow is opposed by the upwardly flowing tubular air portion contiguously to the inwardly-facing peripheries of the throat 22 and of the main chamber portion 28 as illustrated by arrows E, thus preventing reentry of any air into the throat from the upper chamber portion 28. This phenomenon of the tendency for the upwardly-flowing tubular air portion to follow the hourglass-like periphery of the chamber is known as the Coanda effect, so defined in the Third Edition of Van Norstrand's Scientific Encyclopedia as follows: "The tendency of a jet of gas to follow the wall contour when discharged adjacent to a surface even when that surface curves away from the discharge axis is known as the Coanda effect". As a consequence of the core and tubular air stream parts cooperating to prevent downward flow of any air entering the chamber 19, the parts of that air stream are compressed in that chamber in an axial seriatim arrangement in which such parts retain the order of their entry.

Fuel injection through the nozzle 37 occurs mainly during the air intake stroke, although some will continue while the piston is at and sligtly past bottom dead center (BDC), to assure adequate fuel for low speed idle operation. Engine operation is herein described as it occurs with successive modes of fuel delivery to the prechamber, in accordance with power demand. The initial or starting mode is designed for fuel economy and low exhaust emissions during low speed idle and part load operation while only part of the intake air is required to meet power demand. This first operational mode meets increased power demand by increasing the volume of a relatively lean (in fuel) air-fuel stratum relatively to the volume of a fuel-free stratum making up the remainder of the working medium charge. A succeeding and second operational mode meets further increase in power demand by increasing fuel richness of the previously established greatest volume stratum while preserving the stratified charge status providing fuel economy and low emissions. The next succeeding and third operational mode meets still further power demand, up to maximum or rated power, by increasing the volume of the air-fuel stratum until it eventually becomes the entire working medium charge to the exclusion of stratification, to use all of the intaken air for combustion. These three operational modes are illustrated in FIGS. 7 through 31.

To preserve the lean fuel-to-air ratio at different engine speeds during the first operational mode the fuel delivery rate must be correlated with the rate of air delivery into the prechamber and which translates into the average rate at which the variable volume space changes in volume during the injection period, and which average rate is a function of engine speed. And, since the fuel delivery rate is a function of pressure in the fuel delivery line 92, FIG. 5, the pressure regulator 96 is provided for regulating that pressure in accordance with engine speed. So long as engine speed remains constant, fuel forced by the pump plunger upwardly through check valve 91 into fuel delivery line 92 will attain a certain maximum pressure determined by pressure relief valve 101, and this pressure applied to the injector 72 will cause fuel delivery through nozzle 37 at a rate correlated with that pressure. The lowest of that maximum pressure is determined by adjusting the tension in spring 103 urging the ball 104 onto seat 99 and maintaining this adjustment with the locknut 105. An excess of fuel is delivered into the line 92 so that when the desired lowest pressure is attained the valve ball will be forced off of its seat to allow excess fuel to escape through the spring chamber 102, counterbore 106 and the then unmasked spill slot 107. Responsive to increase in engine speed the sensor 117 will act through lever 114, link 115 and fork 111 to shift masking sleeve 108 leftward, as viewed in FIG. 5, to partially close the spill slot and thereby increase back pressure in chamber 102. This increased back pressure augments the force of spring 103 against ball 104 to throttle escape of fuel from line 92 and thereby increase fuel pressure in that line. In the case of an engine of which the air intake ducting is a significant factor in diminishing the rate of air delivery at higher speeds, the effect of speed responsive element 117 can be modulated by an intake manifold pressure sensor 118 which is operable in response to diminished air pressure to modulate the action of element 117 by shifting the pivot 132 at and for the lower end of lever 114.

FIGS. 7 through 11 illustrate the low speed idle phase of the above-mentioned first mode. In FIG. 7 the upper end of the pump plunger 77 is shown at its lowermost position and thus enabling the fill and spill port 82 to fill the space 83 above the plunger, FIG. 5, with fuel from the supply gallery 76. The rotative position of the plunger is such as to axially align port 82 with the lowest part of metering edge 87. Attendant to the ensuing upward pumping stroke of the plunger the engine piston descends, but the masking portion 88 of plunger 77 does not attain closing relation with the port as positioned in FIG. 5 until the metering edge 87 has moved upwardly past that port. Meanwhile engine piston 13 has descended in its air intake stroke from the top dead center (TDC) position of FIG. 8 to the position shown in FIG. 9 when injection begins as shown by the fuel spray represented by fuel population dots in the prechamber of FIG. 9. Injection continues until the lower edge of plunger masking surface 88 rises above port 82, thus allowing fuel to spill through the narrow lower end 89 of the plunger recess 85, groove 86 and port 82 to the supply gallery which is at lower pressure than that required to open check valve 91, FIG. 5. Meanwhile the engine piston has descended to its bottom dead center (BDC) position corresponding to that shown by dotted lines in FIG. 8 and risen to the position shown in FIG. 10. During this excursion of the piston from the FIG. 8 position through BDP to the FIG. 10 position the inlet valve 16 has closed and injected fuel has entered the chamber in an amount to form an air-fuel mixture, lean in fuel, of a volume to charge the chamber with an air-fuel stratum in which the fuel amount is represented by the population of dots. Attendant to continued rise of the piston to approximately 10 crankshaft degrees of completing its compression stroke at TDC shown in FIG. 11, the air-fuel stratum of FIG. 10 will have been compressed into the upper part of the chamber into a discrete stratum, FIG. 11, of increased density of the fuel and oxygen molecules as represented by greater population of dots. The chamber throat 26 and vestibule 27 and the then thin variable volume space 14 in the engine cylinder will at this time contain the fuel-free air stratum. The air-fuel stratum is in readiness for combustion which will be described later with reference to FIG. 32.

While operating within the first mode range, power output can be increased by rotative adjustment of the pump plunger to place a higher position on the metering edge 87 in axial registry with port 82 as shown in FIG. 12. Then when the plunger rises, the metering edge will arrive at port 82 to place plunger portion 88 in masking relation therewith earlier during the air intake stroke of the piston, thereby increasing the length of the injection period and hence increasing the volume of the lean air-fuel mass. The lean air-fuel ratio will prevail even if engine speed changes because of the action of the pressure regulator speed and air pressure sensors 117, 118. The length of the fuel delivery period is measured in volume units of variable volume space 14 in contrast to time. With the pump plunger set at the FIG. 12 position and as it starts its upward motion the piston 13 will begin its downward air intake stroke while the intake valve 16 is open as shown in FIG. 13. Injection into the chamber will commence when the piston descends to the position shown in FIG. 14 at which time the pump plunger masks port 82 to start the injection period somewhat ealier in piston stroke advancement than shown in FIG. 9 during low speed idle operation. The injection period, with this part load operation, will endure while the piston performs its excursive movement from the FIG. 14 position through BDC to the FIG. 15 position. During such piston excursion and the concurrent injection period, fuel will have been injected for a sufficient period to have created the air-fuel stratum of volume represented by the dotted area in FIG. 15. The dots in FIG. 15 are of the same population density as in FIG. 10 to indicate the fuel richness of these strata are the same. During continuation of the compression stroke as the piston rises from the FIG. 15 position to TDC the air-fuel stratum will be compressed into the stratum of which the volume is indicated by the dotted space in FIG. 16. It will be noted that the dot population in FIG. 16 is the same as in FIG. 11 to indicate the same fuel richness in these two strata, but that the FIG. 16 stratum is of greater volume to produce greater power output.

That part of the intake air entering past valve 16 into the chamber 19 and the variable volume space above the piston in cylinder 10 prior to start of fuel injection may be regarded as a leading air portion which in FIG. 14 is the air disposed between piston 13 and the dotted space in chamber 19. A trailing portion of intake air has started entry past valve 16 to where such portion has encountered and mixed with initially injected fuel in the dotted space. During the just-starting injection period while the piston performs its excursive movement from the FIG. 14 position through BDC to the FIG. 15 position, the trailing air portion mixed with fuel will have increased in volume to be that in the space illustrated in FIG. 15 by dots and discretely above the leading air portion then occupying that part of the variable volume space between the dotted space and the piston.

The maximum power attainable with the first operational mode is provided for by adjustive rotation of the pump plunger to the FIG. 17 position wherein the complete masking portion 88 is in axial registry with port 82 to establish masking of that port and start of the injection period still earlier when the piston has descended to the FIG. 9 position. Piston descent from the FIG. 18 position to FIG. 19 position causes the leading portion of intake air, free of fuel, to fill the space between the piston and the upper bulbous part of the chamber. Continued fuel injection while the piston moves excursively from the FIG. 19 position through BDC to the FIG. 20 position will result in the trailing air portion mixing with that fuel to form the air-fuel mass illustrated by dots above the fuel-free leading air portion disposed between that mass and the piston. Continued upward piston movement to TDC shown in FIG. 21 compresses the air-fuel mixture into an axially thicker stratum in chamber 19 than the corresponding stratum of FIG. 16, and, since the air-fuel ratio of these strata are the same, the FIG. 21 loading contains more fuel to attain more power. There is still a fuel-free stratum below the air-fuel stratum so that fuel can be burned in an excess of oxygen.

It can be determined from FIGS. 5 and 17 that by rotating the pump plunger 77 to the FIG. 17 position the fuel rack supporting bar 94a will have moved sufficiently to cause sliding of masking sleeve 123 into position to start covering spill slot 107 of the pressure regulator 96 pursuant to any further plunger rotation. The second operational mode for the engine involves such further plunger rotation which, as illustrated in FIG. 22, is an amount to cause conplete masking of slot 107 by the sleeve 123. During this further adjustive rotation of the plunger a dwell metering edge 130, FIG. 22, coinciding with the circular rim at the upper end of the plunger will continue axial registration with the port 82 so that beginning of masking of this port by masking portion 88 will remain at the same position for piston 13. Since the plunger masking portion 88 will mask and unmask the spill port 82 at the same respective times with relation to piston axial movement as in the case with the plunger rotative position shown in FIG. 17, the fuel injection period and relative porportions of the leading and trailing air portions flowing into the chamber and variable volume space of FIGS. 23, 24 and 25 will be identical with such period and air portions shown respectively in FIGS. 18, 19 and 20 as previously described. The only difference is that the fuel delivery rate is increased as the masking sleeve is advanced to cover more of the spill slot 107 to increase the pressure in the fuel line 92 and the fuel injection rate. Consequently, when the engine power output is increased to the limit of the first operational mode and enters the second mode in response to further plunger rotative adjustment, the air-fuel mass in FIG. 25, while retaining the same volume as the air-fuel mass in FIG. 20, will become richer with fuel as is illustrated by the difference in the dot population of these two FIGS. It follows that the air-fuel stratum compressed in the chamber of FIG. 26 will be richer in fuel than the stratum in FIG. 21 to obtain greater power output.

The first operational mode, illustrated in FIGS. 7 through 21, and the second operational mode, illustrated in FIGS. 22 through 26, each involve stratification which provides an air-fuel stratum spaced upwardly from the piston crown and compressing each stratum into an upper region of its prechamber while compressing fuel-free air immediately thereunder, as illustrated in in FIGS. 11, 16, 21 and 26. The second mode, illustrated in FIGS. 22 through 26, differs from the first mode only in the respect that, while increased fuel amount is obtained by performing with the same length of fuel injection period as existed for the FIGS. 17 through 21 performance, the fuel delivery rate is higher during that period for the FIGS. 22 through 26 performance. Consequently the volumes of the air-fuel strata in FIGS. 25 and 26 respectively equal those volumes of the FIGS. 20 and 21 strata, although the dot density, representing fuel richness, in FIGS. 25 and 26 exceeds that of FIGS. 20 and 21.

A third operational mode, illustrated in FIGS. 27 through 31, follows in succession after the second mode in order to further increase engine power by gradational absorption of of the fuel-free air stratum until all of the gaseous working medium content is an unstratisfied homogeneous air-fuel mixture using all of the intaken air for combustion. This mode is made possible by use of a pump plunger 77a having an upper end portion, FIG. 35, slightly modified from the corresponding portion of plunger 77. The elements of plunger 77a respectively corresponding to elements of plunger 77 are designated by the same respective reference characters plus the letter a. The modification involves lowering the metering edge 87a and groove 86a from the upper end of the plunger and adding a dwell edge 130a and a second helical metering edge 134. Dwell edge 130a serves in operational sequence and function identically with the circular edge 130, FIG. 22, at the upper end of plunger 77. Plunger 77a requires obvious modification of the profile of the pump operating cam 78 and of the position of the spill port 82 axially of the pump barrel, FIG. 5, to obtain the proper stroke range for plunger 77a. FIG. 27 shows in dotted outline the FIG. 22 position of spill port 82 with reference to metering edge 134. Further rotational adjustment of plunger 77a to obtain power output exceeding that obtainable with the FIG. 22 plunger position will bring the metering edge 134 into axial alignment with spill port 82, positioned as shown in solid outline in FIG. 27, to advance start of the injection period and its length while the masking sleeve 123 remains in blocking relation the spill slot 107 as permitted by the spring 126, FIG. 5, whereby the fuel delivery rate of maximum value prevails and the volume of the richer air-fuel stratum will increase. When the plunger rotative adjustment is enough to bring the masking surface extension 135 fully in axial alignment with spill port 82 as shown in solid outline in FIG. 27 the fuel delivery period will be of maximum length and fuel delivery will be at the maximum rate. Fuel injection will commence as piston 13 starts its air intake stroke as illustrated in FIG. 28 and will continue during the piston excursion to and beyond the FIG. 29 position and BDC to the FIG. 30 position so there is no fuel-free leading air portion and no stratification. The prechamber and the variable volume space in the engine cylinder will collectively contain a single homogeneous air-fuel mass as shown shortly after start of compression in FIG. 30 and at completion of compresion with the piston at TDC as shown in FIG. 31.

FIG. 32 illustrates the combustion process ensuing ignition of the low speed idle stratified charge in the prechamber as shown in FIG. 11. In FIG. 32 there is an interface 136 between the air-fuel stratum illustrated by dots and the fuel-free air stratum occupying all of the space below that interface. Pursuant to combustion in the air-fuel stratum initiated at the sparkplug 41, a thin flame front 137, represented by a curved dotted line, expands spherically from the spark electrodes 38 and 39. The gaseous combusted products behind and heated by the flame front increase in pressure and expand to displace the interface 136 ahead of the flame front while compressing and diminishing the volume of the fuel-free air stratum because the piston 13 has very limited axial movement near TDC. Although the interface is thus displaced downwardly in the chamber, this displacement is at a speed less than that of the flame front which overtakes the interface simultaneously with complete combustion of the air-fuel stratum at a position such as 136-137 where the terminating flame 137 coincides with the displaced interface 136. At that time the piston 13 will have descended from TDC illustrated by dotted lines to the position shown by full lines.

FIG. 33 illustrates the combustion process ensuing ignition of the part load stratified charge in the prechamber as appears in FIG. 16. In this case, since the air-fuel stratum is of greater volume than for the low speed idle stratum, the fuel burning period and gas expansion behind the flame front 138 will be greater so the interface 139 will be forced a greater distance to a position as 138-139 before combustion is complete and the terminating flame overtakes the interface. At that time the piston 13 will have descended to the FIG. 33 position.

FIG. 34 illustrates the combustion process ensuing ignition of a greater part load stratified charge in the prechamber as shown in FIG. 21. In this case the air-fuel stratum is of still greater volume resulting in still greater gas expansion behind the flame front 141 thus forcing an interface 142 into the variable volume space 14 before combustion is complete and the terminating flame overtakes the interface at a cylindrical front 141-142 encircling the axis of cylinder 10. The fuel-free air-mass 143 then will be compressed against the cylinder wall into the form of an annulus encircling the cylindrical front 141-142. Piston 13 at this time will have been forced somewhat lower to a position preferably no lower than attained by approximately 35 crankshaft degrees past TDC.

FIGS. 32, 33 and 34 respectively associated with FIGS. 11, 16 and 21 illustrate combustion stages occurring with the first operational mode pursuant to which the amount of fuel burned is determined by modifying the volume of the air-fuel stratum while holding the mixture consistently lean with fuel. FIG. 26 shows a strata arrangement like FIG. 21 and differing only in the respect that the air-fuel stratum is richer in fuel. The difference is brought about by the second operational mode pursuant to which, during formation of the largest volume stratum attainable with the first mode, the rate of fuel delivery is increased in contrast to being held constant. If combustion of the FIG. 26 chamber content were to be illustrated similarly to the FIG. 34 illustration, the only departure from the configuration of FIG. 34 would be that the cylindrical flame and interface front 141-142 would be somewhat more radially expanded to further compress the annular fuel-free air mass 143 because of increased gas pressure resulting from the greater quantity of burned fuel.

Combustion with each of the operational modes, first and second, terminates with a residual quantity of non-burnable fuel-free air, thereby eliminating a residual quantity of burnable mixture which at high compression will detonate or "knock" with engine damaging effect. Since the preponderance of vehicle-propelling engines seldom operate at or near maximum power, the stratified fuel arrangement and combustion process illustrated in FIGS. 7 through 26 and 32 33 and 34 can meet ordinary power demand. However, the third operational mode with fuel strata illustrated in FIGS. 27 through 31 is instantly available in response to inordinate power demand.

Relating the operational modes of this combustion process to the graph of FIG. 6, and again noting that the first mode involves air-fuel strata of equal lean air-fuel mix for low speed idle, low part load and mid part load respectively illustrated in FIGS. 11, 16 and 21. It is contemplated that the air-fuel ratio for this mix would be approximately 20 to 1 at which value the graph indications are favorable for fuel consumption and exhaust emissions. Power is not a critical factor in this range of power demand. The proposal for mode two, illustrated in FIG. 26, is an air-fuel stratum ranging in air-fuel ratio from 20 to 1 to stoichiometric to meet greater power demand. Although the graph indicates the stoichiomatic end of this ratio range would substantially increase nitric oxides ($NO_x$), it is to be noted that the graph relates to a non-stratified air-fuel mass and therefore is not in conflict with the explanation in the preceding Summary why fuel burned in an air-fuel stratum diminishes $NO_x$. Operational mode three, illustrated in FIG. 31 while operation is at maximum power, may operate with an air-fuel stratum having air-fuel ratio near stoichiomatic and ranging in volume from that shown in corresponding FIG. 26 to a volume completely filling the variable volume space as shown in FIG. 31. Stratification, though progressively diminishing, would prevail until ultimate attainment of maximum power.

FIGS. 36 and 37 illustrate an alternative connection 119A between the pump plunger 77 and masking sleeve 123 of the pressure regulator 96, FIG. 5, to provide a fourth operating mode instead of the three successively performing modes explained with reference to FIGS. 7 through 31. The schematically illustrated connection 119A includes the gear 94 fixed to the pump plunger, gear rack 93 and its holder bar 94a, connection 119, lost motion device 121 and sleeve shifter fork 122 all shown in FIG. 5. The connection 119A, FIGS. 36 and 37, establishes a different operating phase relation between the plunger 77 and masking sleeve 123. This difference is discernible by comparing the position of sleeve 123 relatively to spill slot 107 as shown in FIG. 7 and at the time engine piston 13 commences its air intake stroke, FIG. 8, with the position of that sleeve relatively to the spill slot as shown in FIG. 36 also at the time the engine piston commences its air intake stroke. The difference is that in FIG. 36, which relates to low speed idle as does FIG. 7, the masking device 123 is in position to have begun masking spill slot 207 by the time the pump plunger rises sufficiently to have masked spill port 82 with the masking portion 88 to cause fuel delivery. As the plunger is rotatively adjusted attendant to moving metering edge 87 rightward as viewed in FIG. 36 to cause fuel injection to commence earlier during the air intake stroke and thereby increase the length of the injection period, the sleeve 123 will simultaneously likewise move rightward to increase the fuel delivery rate in the manner described above.

With each increment of rotative adjustment of the pump plunger, the above-defined trailing air portion entering and injected with fuel in the chamber 19 will increase in volume as will its fuel richness because the spill slot 107 will have a greater part masked by sleeve 123. Stratification will occur with each of the plunger adjustments, though progressively with less volume of the fuel-free air stratum, until adjustment attains the maximum power position shown in FIG. 37. This maximum power setting corresponds to the FIG. 27 setting to cause fuel delivery into the chamber and variable volume space in the quantity and synchronized relation with piston movement as illustrated in FIGS. 28 through 31. All of the intaken air will be used in the ensuing combination.

FIG. 38 is a sectional view through a modified combustion chamber 19a having thicker vanes 31a than 31 and less likely to develop hot spots causing preignition. Chamber 19a is adapted to connect onto air inlet passage 15 in place of chamber 19, when formed into the cylinder head 11 and to function in the manner explained with respect to chamber 19.

I claim:

1. In an internal combustion engine having a main air inlet passage communicating at an end thereof through the face of a cylinder head with an alternately expandable and contractable variable volume space in an end of a cylinder closed by such head, there being within the cylinder head a precombustion chamber forming a section of such passage and interposed between said space and an upstream portion of said passage, the chamber having a principal axis extending between opposite ends thereof and of which ends one is an air inlet and having a valve seat through which the chamber is communicative with the upstream passage portion and of which ends the other is an open end through which the passage has two-way communication with said space and is disposed to discharge air from the chamber into said space axially of the cylinder, the combination of air deflecting means in said chamber and operable during expansion of said space to modulate the flow of intake air passing through the chamber into said space into the form of a stream composed of a core portion flowing axially of the cylinder into said space and of a tubular portion encircling the core portion and flowing helically thereabout, fuel delivery means operable during a fuel injection period commencing during expansion of said space and subsequent to entry of a leading portion of the air stream into said space to inject evaporative fuel into the passage and into a trailing portion of said air stream therein at a rate to mix and form therewith an air-fuel mixture lean in fuel richness that flows within and at least partially through the chamber en route to said space during said expansion thereof, said fuel delivery means being operable to increase the volume of the trailing air stream portion mixed with fuel by advancing the starting time of the fuel injection period to increase the length of such period measured in units of space expansion, the fuel delivery means being further operable during engine operation, while the fuel delivery period is of said increased length, to increase said rate of fuel delivery and thereby increase the fuel richness of the air-fuel mixture, and, during the ensuing contraction of said space that causes part of the air-fuel mixture and part of the leading air portion within said space to flow therefrom reversely through the chamber open end into the chamber, said air deflecting means is operable to cause such reverse flow to take the form of a stream composed of a central core portion flowing axially within the chamber and a tubular portion helically about that core portion.

2. In an internal combustion engine having a main air inlet passage communicating with an alternately expandable and contractable variable volume space within a cylinder of such engine, the combination of a precombustion chamber forming a section of said passage contiguous with said space and having opposite ends of which one is an open end and disposed with its center contiguous with the cylinder longitudinal axis and providing two-way communication of the passage, axially of the cylinder, with said space, the chamber serving pursuant to space expansion to conduct air therethrough and discharge it through said open end in the form of a stream directed into said space axially of the cylinder; the chamber, pursuant to ensuing contracting of said space, being receptive of reverse flow of the air from said space and in the form of a stream entering through its open end axially into the chamber, air deflecting means in the chamber and operable during expansion of said space to compose said air stream entering said space into a core portion flowing axially of the cylinder and into a tubular portion encircling the core portion and flowing helically thereabout, and said air deflecting means also being operable during the ensuing space contraction to similarly compose the air stream entering the chamber into a core portion flowing axially into the chamber and a tubular portion encircling and flowing helically about the core portion, the chamber other end includes an air inlet valve seat through which an upstream portion of the passage is communicative with the chamber for delivery of the air thereinto, and air first flowing into and at least partially through the chamber into said space pursuant to space expansion constitutes a leading air portion followed by a trailing air portion of which at least part occupies the chamber at termination of said space expansion, and fuel delivery means operable during a fuel injection period commencing during space expansion to inject evaporative fuel into said trailing air portion at a rate to mix and form therewith an air-fuel mixture lean in fuel richness, said fuel delivery means also being operable to increase the volume of the trailing air portion constituting said mixture by advancing the starting time of said injection period to increase the length of such period measured in units of space expansion, the fuel delivery means being further operable during engine operation, while the injection period is of said increased length, to increase the rate of fuel delivery and thereby increase the fuel richness of the air-fuel mixture.

3. The combination set forth in claim 2, wherein the fuel delivery means also includes means operable to increase the fuel delivery rate as a direct function of engine speed.

4. In an internal combustion engine having a combustion chamber into which the main intake air progressively enters en route to the variable volume space within a cylinder of such engine during the air intake stroke of a piston within said cylinder, fuel delivery means comprising, a fuel injector adapted to inject evaporative fuel into said chamber and a trailing portion of air entering thereinto successively following entry of a leading portion of said air, the injected fuel being for mixing with the trailing air portion to form therewith a spark-ignitable air-fuel mass of which the volume is determined by the length of an injection period, measured in units of piston stroke movement, during which fuel is injected into the entering air, the fuel delivery means being operable during a first mode of operation to deliver said fuel to its injector en route into said chamber and air therein during said fuel injection period and being controllable to progressively advance the starting time of fuel injection during the air intake stroke to lengthen the injection period and hence the volume of the air-fuel mass while limiting change in the air-fuel ratio thereof, and means operable, during a second mode of operation, subsequent to attainment of a predetermined volume increase of the air-fuel mass and without further volume increase of the air-fuel mass, to increase the rate at which said fuel is delivered and injected into said entering air-fuel mass.

5. The process of delivering fuel into an engine pre-combustion chamber having opposite ends and through an open one of which ends the chamber communicates through a face of a cylinder head with an alternately expandable and contractable variable volume space in a cylinder of such engine closed at one end by said head, said process comprising a step, occuring during expansion of said space, of introducing into the chamber air consisting of a leading portion which is caused to flow through the chamber and the open end thereof into said space and also consisting of a trailing portion which occupies the chamber and part of the cylinder disposed between the cylinder head and the leading air portion at termination of the space expansion, creating with the trailing air portion a spark-ignitable air-fuel mixture leaner with fuel than the stoichiometric air-fuel ratio for such fuel and of a mass selectively increasable by injecting into the chamber and such trailing air portion, during an injection period, fuel in an amount determined at least in part by selectively advancing the starting time of the injection period to lengthen such period and thus affect an operational mode pursuant to which a quantity of said leaner mixture is variable in volumetric amount from that sufficient to attain low speed idle operation of the engine to a greater amount which attains a part load operation thereof pursuant to an injection period of maximum length, a further step, performed during an injection period of substantially said maximum length, of increasing the fuel delivery rate to increase fuel richness of the mixture and thereby effect a second operational mode pursuant to which fuel richness of the mixture is variable from an air-fuel ratio sufficient to obtain said part load operation of the engine to such a ratio that is sufficient to obtain a greater load operation thereof, a further step, occurring during ensuing contraction of said space and attendant to flow of the cylinder-disposed part of the trailing air portion and at least part of the leading air portion, in the order just recited, reversely through the chamber open end in the form of a stream, and the step of controlling the composition and motion of said stream to obtain compression of the spark-ignitable mixture into a concentrated mass adjacently to the other end of the chamber attendant to disposing air of the leading air portion part to form an adjoining air mass adjacently to the chamber open end.

6. The process as set forth in claim 5, wherein the length of the fuel injection period is directly correlated with volume change of the variable volume space during its expansion and wherein the fuel delivery rate is a direct function of pressure applied to the fuel to force injection thereof, and the further step of varying such applied pressure as a direct function of engine speed to conpensate for change in time duration of the fuel injection period by change in engine speed.

7. The process of delivering fuel into an engine cylinder having at one end a head with an air intake passage communicating with the cylinder wherein a piston axially reciprocates to increase the volume of a variable volume space between the piston and cylinder head pursuant to piston movement away from the head and decrease such volume pursuant to piston movement toward the head, said process comprising the step of delivering through said passage into the head end of said space an air mass composed of a leading portion of air during piston movement from a top dead center limit of its reciprocal movement adjacent the head toward a bottom dead center position at the opposite limit of its reciprocal movement and succeeding delivery of said air mass with similar delivery into said space of a trailing air portion bearing evaporative fuel and discretely disposed in the form of an air-fuel mass between the leading air mass and the cylinder head, and the compound step of performing, during engine operation, consecutive fuel addition modes pursuant to which the trailing air portion is respectively leanly mixed with fuel injected thereinto for low speed idle operation and for part load operation of the engine and likewise more richly mixed with fuel for engine operation at greater loads, such performance of the lean mixture mode involving increasing duration of the period during which injection occurs by starting such injection into the trailing air portion earlier during expansion of said space to increase the volume of the leanly mixed air-fuel mass, and such performance of the richer mixture mode commencing with attainment of said increased volume and involving progressively increasing the delivery rate of injected fuel during continued engine operation with said increased volume of the air-fuel mass.

8. A process as set forth in claim 7, wherein a section of the air intake passage adjacently to the engine cylinder is a combustion chamber having an air inlet end remote from the variable volume space and an end adjacently to and through which the passage has two-way communication with said space and through which said leading and trailing air portions flow into the variable volume space during its expansion, and the further step, occuring during a compression stroke of the piston ensuing formation of the discrete masses of air-fuel and air within the variable volume space, of forcing said masses, air-fuel mass foremost, in the form of a stream flowing from said space into the chamber while controlling the composition of said stream to compress the air-fuel mass adjacently to the chamber inlet end and disposing part of the stream composed of the air mass to occupy that part of the chamber adjacently to the variable volume space.

9. A process as set forth in claim 8, wherein the air is introduced into the head end of the cylinder in the form of a stream composed of a core portion directed axially into the cylinder and of a tubular portion surrounding the core portion, and the step of radially expanding the core portion and directing it helically about the cylinder axis adjacently to the cylinder sidewall and advancively toward the piston.

10. A process performed as in any of claims 7, 8 or 9, wherein the fuel delivery rate is a direct function of pressure applied to the fuel to force injection thereof, and the further step of varying such applied pressure as a direct function of engine speed to compensate for change in time duration of the fuel injection period pursuant to change in engine speed.

11. In an internal combustion spark-ignition engine having a cylinder head presenting a face thereof in closing relation with an end of a cylinder wherein a piston is reciprocal to move alternately away from said face during an air intake stroke and toward said facing during the ensuing compression stroke, said head containing an air intake passage having two-way communication through an open end thereof within said face axially into the cylinder, a section of the passage contiguous with said open end being in the form of a combustion chamber containing spark electrodes in an end remote from said open end, the passage being operable during the piston intake stroke to conduct a leading air portion through the chamber and its open end into the cylinder and followed by a first part of a trailing fuel-bearing air portion of which a second part remains in the chamber while said first part is disposed in the cylinder between the leading air portion and the cylinder head face at termination of the air intake stroke, the volume of said trailing fuel-bearing air portion being determined by the length of the period during which fuel, spark ignitable when mixed with air, is injected into the chamber and air therein, which period is measured in units of pistom axial movement, the combination of, air deflecting means disposed in the chamber and configured to compose the leading air portion and the first part of the fuel-bearing trailing air portion in their aforeaid relative disposition at termination of the air intake stroke, and fuel delivery means, comprising a fuel injecting nozzle communicating into the combustion chamber and operable attendant to fuel being forced therethrough to inject such fuel into the chamber, the fuel delivery means being operated synchronously with movement of the piston to force fuel through the nozzle into the chamber and said trailing air portion therein to form said fuel-bearing trailing air portion not exceeding a low fuel density and depending on increased volume to increase power during the first mode of the fuel injection period, and fuel quantity control means in control of said fuel delivery means and advanceable in response to demand for additional fuel in the intaken air during the first mode, means operable in a second mode during fuel delivery as in the first mode in response to further incremental advance of said control means to add additional fuel to said fuel-bearing trailing air portion, and said engine being operable pursuant to the compression stroke of the piston to compress the trailing and leading portions of the air stream into the precombustion chamber in the reverse order of their formation preparatory to ignition of the compressed trailing portion in the remote end of said combustion chamber.

12. In an internal combustion engine having a main air inlet passage communicative at an end thereof through the face of a cylinder head with an alternately expandable and contractable variable volume space in an end of a cylinder closed by such head, there being within the cylinder head a precombustion chamber forming a section of said passage and interposed between said face and an upstream portion of said passage, the chamber having opposite ends of which one is an air inlet and having a poppet valve seat through which the chamber is communicative with the upstream passage portion and of which ends the other is an open end through which the passage has two-way communication with said space axially of the cylinder, and the passage being operable pursuant to expansion of said space to conduct a stream of intake air to flow serially within and from the upstream passage portion through the valve seat and the chamber into said space, a valve head complemental to said valve seat, and an inner peripheral wall structure of the chamber being configured to modulate that portion of the stream flowing into the variable volume space into a core portion and a helical flowing tubular portion surrounding said core portion forming strata disposed in seriatim axially of the cylinder wherein a leading portion of the stream is a stratum most distant from the prechamber and a trailing portion of the stream is a stratum contiguous to the prechamber and partly within such chamber, the combination of fuel delivery means operable during a fuel injection period, commencing subsequent to entry of said leading air portion into said space, to inject evaporative fuel into the passage and into said trailing air portion during a period of which the length determines the volume of such trailing air portion and at an injection rate to mix with and form with such trailing air portion an air-fuel mixture of lean-in-fuel richness, said fuel delivery means including a power demand control structure advanceable to incrementally adjust such means to correspondingly increase the quantity of fuel delivered during such expansion of said space, said fuel delivery means being operable in response to advancement of said control structure within a first mode range of its advancement to increase the length of such injection period and hence the volume of the trailing air stream portion, comprising the lean-in-fuel mixture, by advancing the starting time of such period while preserving a lean-in-fuel character of such mixture, said fuel delivery means being further operable upon a predetermined expansion of said space and in respone to advancement of the power demand control structure within a more advanced range to increase (both the length of the fuel delivery period and) the fuel delivery rate to increase the (volume and) fuel richness of the air-fuel mixture, and the configuration of the chamber inner peripheral wall structure being operable during ensuing contraction of said space to receive from said space the trailing air-fuel mixture stratum and at least part of the leading air portion stratum within said chamber in the reverse order of their prior entry into said space and to form respective stratum disposed in seriatim axially within the chamber with the air-fuel mixture stratum contiguous with the chamber's air inlet end.

13. The combination set forth in claim 12, wherein the more advanced range is completed prior to entry of all of the trailing air portion into the prechamber and wherein said fuel delivery means is operable in response to further advancement of the power demand control structure, subsequent to completion of the second mode range, to start a third operational mode pursuant to which the fuel injection period is extended to the end of the air intake period during which the rate of injection is increased an amount to increase the fuel richness.

14. In an internal combustion engine having a primary air intake passage within a cylinder head for a cylinder of such engine having an alternately expandable and contractable variable volume space in an end of such cylinder closed by such cylinder head and adjacent to said head, said passage containing a precombustion chamber having at one end an opening with two-way communication with said variable volume space and communicating at the other end through a poppet valve seat with an upstream portion of said passage and through which the intake air is flowable as a stream when the seat is open and a piston in the variable volume space is decending in the air intake stroke, a valve head complemental to said valve seat and an inner peripheral wall structure of the chamber being configured to modulate the stream into strata disposed in seriatim axially of the cylinder wherein a leading portion of the stream stratum most distantly from the prechamber is disposed adjacent to the piston in the cylinder and a trailing portion of the stream becomes a stratum contiguous to the prechamber and partly within such chamber, the combination of fuel delivery means operable during a fuel injection period, commencing subsequent to entry of said leading air portion into said space, to inject evaporative fuel into the passage and into said trailing portion during a period of which the length determines the volume of such trailing air portion and at an injection rate to mix with such trailing portion of air in such chamber at an injection rate to form with such trailing air portion an air-fuel mixture of lean-in-fuel richness, said fuel delivery means including a power demand control structure advanceable to incrementally increase the fuel delivery period of such fuel delivery means to correspondingly increase the quantity of fuel delivered to said trailing air portion at the same rate during continuation of this phase of the fuel delivery period, said fuel delivery means also including means controlling the pressure of the delivered fuel and operable under control of said power demand control structure to increase the pressure and delivery rate of the fuel during a succeeding phase of fuel delivery to increase the fuel richness of the air-fuel mixture in accordance with advance of said power demand control structure, and said engine being operable upon the closing of said poppet valve and pursuant to the contraction stroke to compress the trailing and leading portions of the air stream into the precombustion chamber in the reverse order of their formation preparatory to ignition of the compressed trailing portion adjacent to the poppet valve end of the prechamber.

15. In an internal combustion engine having a primary air intake passage wihtin a cylinder head for a cylinder of such engine having an alternately expandable and contractable variable volume space in an end of such cylinder closed by such cylinder head and adjacent to said head, said expandable and contractable character of the variable volume space being incurred by air intake and compression strokes of a piston in said variable volume space, said passage containing a precombustion chamber having at an end an opening with two-way communication with said variable volume space and communication at the other end through a poppet valve seat with an upstream portion of said passage and through which the intake air is flowable as a stream when the seat is open and the piston in the variable volume space is descending in the air intake stroke, a valve head complemental to said valve seat and an inner peripheral wall structure of the chamber being configured to modulate the stream into strata disposed in seriatim axially of the cylinder wherein a leading portion of the stream stratum first to enter the cylinder and disposed most distantly from the prechamber adjacently to the piston in the cylinder and a trailing portion of the stream following the leading portion becomes a stratum contiguous to the prechamber and partly within such chamber, the combination of fuel delivery means operable during a fuel injection period, commencing subsequently to entry of said leading air portion into said chamber en route to the variable volume space, to inject evaporative fuel into said passage and into said trailing air portion to mix therewith in said chamber and at an injection rate to initially form with said trailing air portion an air-fuel mixture of lean-in-fuel richness, said fuel delivery means including a power demand control structure advanceable to incrementally increase the fuel delivery rate during the fuel delivery period an amount sufficiently to increase the fuel richness in the trailing air portion, and said engine being operable upon the closing of said poppet valve and pursuant to the compression stroke of said piston to compress the trailing and leading portions of the air stream into the combustion chamber in the reverse order of their formation to place the compressed trailing portion adjacent to the other end of the combustion chamber preparatory to ignition.

16. In an internal combustion engine having a primary air intake passage within a cylinder head for a cylinder of such engine having an alternately expandable and contractable variable volume space in an end of such cylinder closed by such cylinder head and adjacent to said head, said expandable and contractable character of the variable volume space being incurred by air intake and compression strokes of a piston in said variable volume space, said passage containing a precombustion chamber having at an end an opening with two-way communication with said variable volume space and communication at the other end through a poppet valve seat with an upstream portion of said passage and through which the intake air is flowable as a stream when the seat is open and the piston in the variable volume space is descending in the air intake stroke, a valve head complemental to said valve seat and an inner peripheral wall structure of the chamber being configured to modulate the stream into strata disposed in seriatim axially of the cylinder wherein a leading portion of the stream stratum first to enter the cylinder and disposed most distantly from the prechamber adjacently to the piston in the cylinder and a trailing portion of the stream following the leading portion becomes a stratum contiguous to the prechamber and partly within such chamber, the combination of fuel delivery means operable during a fuel injection period, commencing subsequently to entry of said leading air portion into said chamber en route to the variable volume space, to inject evaporative fuel into said passage and into said trailing air portion to mix therewith in said chamber and at an injection rate to initially form with said trailing air portion an air-fuel mixture of lean-in-fuel richness, said fuel delivery means including a power demand control structure advanceable first without significant change in the fuel richness of the trailing air portion and later advanceable to incrementally increase the fuel delivery rate during a later part of the fuel delivery period by an amount to significantly increase the fuel richness of such trailing air portion, and said engine being operable upon the closing of said poppet valve and pursuant to the compression stroke of said piston to compress the trailing and leading portions of the air stream into the combustion chamber in the reverse order of their formation to place the compressed trailing portion adjacent to the other end of the combustion chamber preparatory to ignition.

17. In an internal combustion spark-ignition engine having a cylinder head presenting a face thereof in closing relation with an end of a cylinder wherein a piston is reciprocal to move alternately away from said face during an air intake stroke and toward said face during the ensuing compression stroke, said head containing an air intake passage having two-way communication through an open end thereof within said face axially into the cylinder, a section of the passage contiguous with said open end being in the form of a combustion chamber containing spark electrodes in an end remote from said open end, the passage being operable during the piston intake stroke to conduct a leading air portion through the chamber and its open end into the cylinder and followed by a first part of a trailing fuel-bearing air portion of which a second part remains in the chamber while said first part is disposed in the cylinder between the leading air portion and the cylinder head face at termination of the air intake stroke, the volume of said trailing fuel-bearing air portion being determined by the length of the period during which fuel, spark ignitable when mixed with air, is injected into the chamber and air therein, which period is measured in units of piston axial movement, the combination of, air deflecting means disposed in the chamber and configured to compose the leading air portion and the first part of the fuel-bearing trailing air portion in their aforesaid relative disposition at termination of the air intake stroke, and fuel delivery means, comprising a fuel injection nozzle communicating into the combustion chamber and operable attendant to fuel being forced therethrough to inject such fuel into the chamber, a conduit for delivering fuel to said nozzle and containing a fuel spill valve normally open to allow some spilling of fuel to limit the amount of fuel delivered to the nozzle, the fuel delivery means being operated synchronously with movement of the piston to force fuel through the conduit and nozzle into the chamber and said trailing air portion therein to form said fuel-bearing trailing air portion not exceeding a low fuel density and depending on increased volume to increase power during the first mode of the fuel injection period, fuel quantity control means in control of said fuel delivery means and advanceable in response to demand for additional fuel in the intaken during the first mode, means operable in a second mode during fuel delivery in the first mode and in response to further incremental advance of said fuel quantity control means to incrementally close said spill valve to increase the amount of fuel delivered to the injector and to the fuel-bearing air portion, and said engine being operable pursuant to the compression stroke of the piston to compress the trailing and leading portions of the air stream into the pre-combustion chamber in the reverse order of their formation preparatory to ignition of the compressed trailing portion in the remote end of said combustion chamber.

18. In an internal combustion engine havng a combustion chamber into which the main intake air progressively enters en route to the variable volume space within a cylinder of such engine during the air intake stroke of a piston within said cylinder, fuel delivery means comprising, a fuel injector adapted to inject evaporative fuel into said chamber and a trailing portion of air entering thereinto successively following entry of a leading portion of said air, the injected fuel being for mixing with the trailing air portion to form therewith a spark-ignitable air-fuel mass of which the volume is determined by the length of an injection period, measured in units of piston stroke movement, during which fuel is injected into the entering air, a fuel pump for delivering fuel through a conduit leading to said injector and including a spill valve normally open to allow some spilling of fuel to limit the amount of fuel delivered to the injector, fuel quantity control means in control of said pump and operable during a first mode in which it is advanceable to progressive advance the starting time thereof and delivery of fuel to said injector during the air intake stroke to lengthen the injection period and hence the volume of the air-fuel mass while limiting much change in the air-fuel ratio thereof during the first mode of operation, and a second mode of operation wherein said fuel quantity control means is in control of said spill valve and being operable upon further advance thereof, after attainment of a predetermined volume of said air-fuel mass, to incrementally close said spill valve and thereby increase the rate of fuel delivery to said injector and the fuel richness of the air-fuel mass.

19. In an internal combustion engine having a combustion chamber into which the main intake air progressively enters en route to the variable volume space within a cylinder of such engine during the air intake stroke of a piston within said cylinder, fuel delivery means comprising, a fuel injector adapted to inject evaporative fuel into said chamber and a trailing portion of air entering thereinto successively following entry of a leading portion of said air, the injected fuel being for mixing with the trailing air portion to form therewith a spark-ignitable air-fuel mass of which the volume is determined by the length of an injection period, measured in units of piston stroke movement, during which fuel is injected into the entering air, the fuel delivery means being operable during a first mode of operation to deliver said fuel to its injector en route into said chamber and air therein during said fuel injection period and being controllable to progressively advance the starting time of fuel injection during the air intake stroke to lengthen the injection period and hence the volume of the air-fuel mass while limiting change in the air-fuel ratio thereof, and means operable, during a second mode of operation, subsequent to attainment of a predetermined volume increase of the air-fuel mass and with curtailment of further volume increase of the air-fuel mass, to increase the air-fuel ratio of said air-fuel mass by continuing the injection of fuel thereinto during entry thereof into the chamber.

20. In an internal combustion engine having a combustion chamber into which the main intake air progressively enters through an entry end thereof en route to the variable volume space within a cylinder of such engine during an air intake stroke of a piston within said cylinder, the intake air being in the form of a stream and the combustion chamber having an inner peripheral structure configured to modulate the stream into a core portion flowing axially into said space and a helical flowing tubular portion surrounding said core portion, fuel delivery means comprising, a fuel injector adapted to inject evaporative fuel into said chamber and a trailing portion of air entering thereinto successively following entry of a leading portion of said air, the injected fuel being for mixing with a trailing air portion to form therewith a spark-ignitable air-fuel mass of which the volume is determined by the length of an injection period, measured in units of piston stroke movement, during which fuel is injected into the entering air, a fuel pump for delivering fuel through a conduit leading to said injector and including a pressure relief valve normally operable to impose limited pressure on said injector to cause fuel delivery at a certain rate, but increasable in such rate by a spill valve receptive of overflow fuel from the pressure relief valve and operable by closing to restrict such overflow to increase the fuel pressure on the injector and the fuel delivery thereby, fuel quantity control means in control of said pump and operable during a first mode in which it is advanceable to progressively advance the starting time thereof and delivery of fuel to said injector during the air intake stroke to lengthen the injection period and hence the volume of the air-fuel mass while limiting much change in the air-fuel ratio thereof during the first mode of operation, a second mode of operation wherein said fuel quantity control means is in control of said spill valve and being operable upon further advance thereof, after attainment of a predetermined volume of said air-fuel mass, to incrementally close said spill valve and thereby increase the rate of fuel delivery to said injector and the fuel richness of the air-fuel mass, and the engine being operable during the ensuing compression stroke to compress at least part of said trailing air-fuel mass into said entry end of said combustion chamber where there are spark electrodes for igniting such mass.

* * * * *

UNITED STATES PATENT AND TRADEMARK OFFICE
CERTIFICATE OF CORRECTION

PATENT NO. : 4,784,098

DATED : November 15, 1988

INVENTOR(S) : Noel G. Artman

It is certified that error appears in the above-identified patent and that said Letters Patent is hereby corrected as shown below:

Column 21, lines 48 and 49, cancel "(both the length of the fuel delivery period and)" and lines 49 and 50 cancel "(volume and)".

Signed and Sealed this

Twenty-first Day of November, 1989

Attest:

JEFFREY M. SAMUELS

Attesting Officer      Acting Commissioner of Patents and Trademarks